United States Patent
Marshall et al.

(10) Patent No.: US 6,758,386 B2
(45) Date of Patent: Jul. 6, 2004

(54) METHOD OF JOINING CERAMIC MATRIX COMPOSITES AND METALS

(75) Inventors: David B. Marshall, Thousand Oaks, CA (US); Min Z Berbon, Simi Valley, CA (US); John R. Porter, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/954,753

(22) Filed: Sep. 18, 2001

(65) Prior Publication Data

US 2003/0052154 A1 Mar. 20, 2003

(51) Int. Cl.[7] .................... B23K 31/02; B32B 18/00; B32B 9/00
(52) U.S. Cl. ............... 228/120; 428/293.4; 428/469
(58) Field of Search .................... 228/120, 122.1, 228/121, 123.1, 124.7, 131–133, 244, 245, 124.1, 124.5; 428/34.5, 293.4, 469–472, 688, 124.1, 124.5; 139/383 R; 29/890.01

(56) References Cited

U.S. PATENT DOCUMENTS

| | | | |
|---|---|---|---|
| 3,830,173 A | | 8/1974 | Hubble et al. |
| 4,311,505 A | | 1/1982 | Yasui et al. |
| 4,376,374 A | * | 3/1983 | Bothwell .................... 123/668 |
| 4,642,864 A | * | 2/1987 | Metcalfe et al. ............... 165/4 |
| 4,883,217 A | | 11/1989 | Dunn et al. |
| 4,883,218 A | | 11/1989 | Dunn et al. |
| 5,055,361 A | | 10/1991 | Dunn et al. |
| 5,108,025 A | * | 4/1992 | Kang et al. ............... 228/124.7 |
| 5,125,179 A | * | 6/1992 | Campbell et al. .......... 42/76.02 |
| 5,208,071 A | * | 5/1993 | Davis et al. ................. 427/253 |
| 5,230,306 A | * | 7/1993 | Barringer et al. ........... 122/383 |
| 5,231,833 A | * | 8/1993 | MacLean et al. ............. 60/734 |
| 5,365,661 A | | 11/1994 | Mizuno et al. |
| 5,420,085 A | * | 5/1995 | Newkirk et al. ........... 501/98.4 |
| 5,433,486 A | | 7/1995 | Mannl et al. |
| 5,438,834 A | * | 8/1995 | Vuillamy et al. ........... 431/242 |
| 5,552,670 A | | 9/1996 | Heider et al. |
| 5,639,322 A | * | 6/1997 | Okuda et al. .................. 156/64 |
| 5,681,511 A | * | 10/1997 | Streckert et al. ........... 264/29.7 |
| 5,855,828 A | * | 1/1999 | Tuffias et al. ................ 164/122 |
| 5,874,175 A | * | 2/1999 | Li ............................... 428/408 |
| 5,947,094 A | * | 9/1999 | Atmur et al. ................ 123/668 |
| 6,174,490 B1 | | 1/2001 | Brinkman et al. |
| 6,290,743 B1 | * | 9/2001 | Alvin et al. ................... 55/482 |
| 6,394,281 B2 | * | 5/2002 | Ritland et al. .............. 210/232 |
| 6,418,973 B1 | * | 7/2002 | Cox et al. ............... 139/383 R |

OTHER PUBLICATIONS www.britannica.com/eb/article, Advanced ceramics, Reaction sintering, 2 pages.

* cited by examiner

*Primary Examiner*—L. Edmondson
(74) *Attorney, Agent, or Firm*—Harness Dickey & Pierce P.L.C.

(57) ABSTRACT

A method of joining a ceramic matrix composite rocket nozzle to a metal manifold is provided, wherein a silicon nitride insert is disposed inside the ceramic matrix composite rocket nozzle and the metal manifold to provide a joint therebetween. The silicon nitride insert is preferably co-processed with the ceramic matrix composite rocket nozzle such that the ceramic matrix provides a bond between the rocket nozzle and the insert. The metal manifold is then secured to the silicon nitride insert, preferably using brazing, to form a joint assembly.

19 Claims, 1 Drawing Sheet

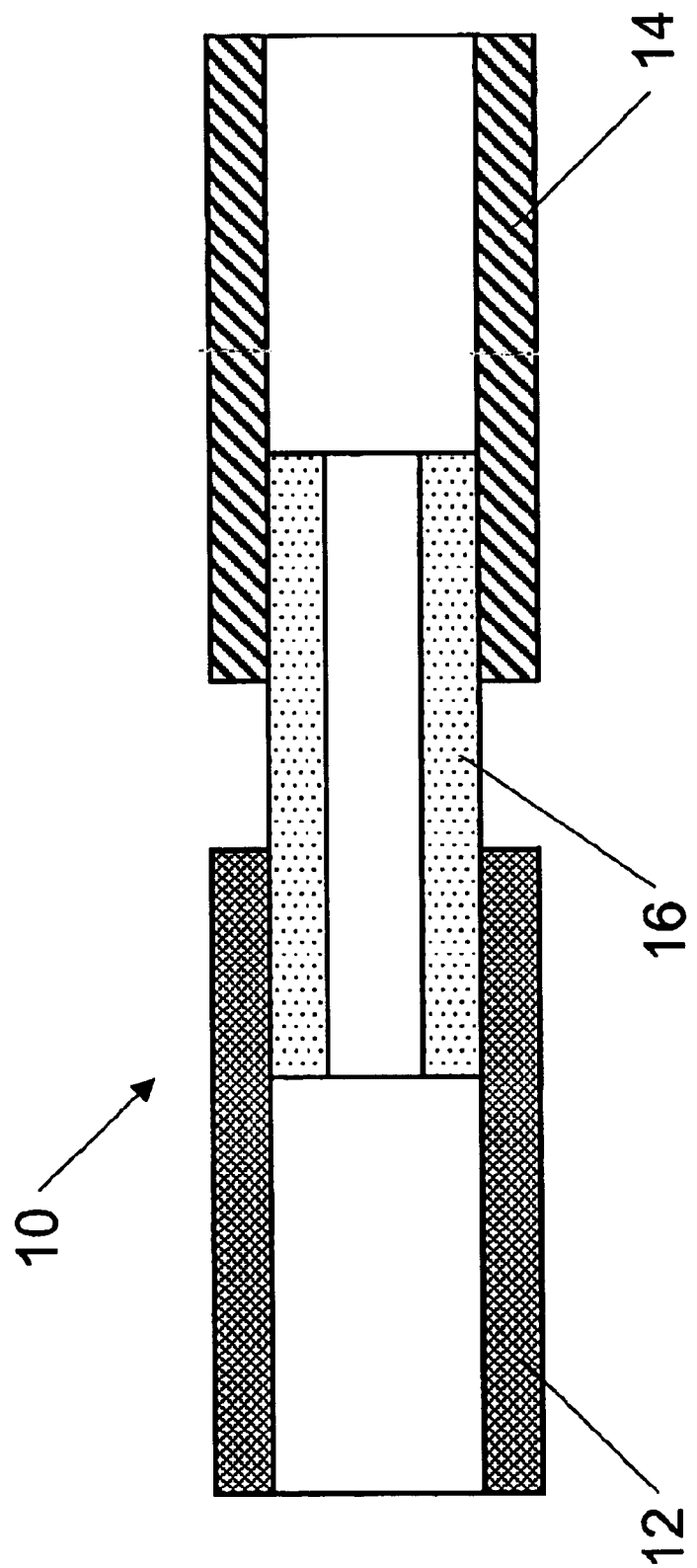

METHOD OF JOINING CERAMIC MATRIX COMPOSITES AND METALS

FIELD OF THE INVENTION

The present invention relates generally to rocket engines and more particularly to methods of joining a ceramic matrix composite rocket nozzle to a metal manifold.

BACKGROUND OF THE INVENTION

An increasing amount of composite structures are being utilized in certain aerospace vehicle applications, primarily due to significant weight savings that can be achieved over conventional metallic structures. However, the performance improvements of the composite structures must be carefully balanced with overall cost, and as a result, a combination of composite structures and conventional metallic structures commonly exist within an aerospace vehicle. Accordingly, the composite structures must be joined to the conventional metallic structures for vehicle assembly without significant performance degradations or increased costs.

In aerospace vehicles, a significant portion of the vehicle structure may be subjected to extreme thermal conditions, wherein the structure must be capable of withstanding relatively high aerothermal loads during a variety of conditions. For example, rocket nozzles experience temperatures in excess of 1,000° C. (1,832° F.) for extended periods of time, and accordingly, the nozzles must comprise materials that can withstand such high temperatures over an extended period. In a known application, the rocket nozzle is a composite structure that comprises carbon fibers within a ceramic matrix in order to withstand the high temperatures. The rocket nozzle must further be joined to a manifold, which is generally a metal material, however, conventional techniques such as brazing are not suitable between the ceramic composite structure and the metal manifold due to high localized temperatures.

The joining of ceramic components to metal components is known in the art and may be accomplished using, for example, pressure insertion, thermal insertion, chill insertion, or a combination of such methods along with soldering or brazing. For example, U.S. Pat. No. 5,365,661 to Mizuno et al. discloses a ceramic-metal joint body that controls circularity of a ceramic member during a joining process. Unfortunately, the ceramic-metal joint body encases the metal member in its entirety, which is not practical in aerospace applications due to constraints on overall vehicle weight and performance.

Yet another method of joining a ceramic component to a metal component is disclosed in U.S. Pat. No. 5,552,670 to Heider et al. Generally, Heider et al. discloses a vacuum-tight seal between a ceramic tube and a metal tube that uses plugs inside the ceramic tube into which the metal tube is sintered. Unfortunately, the sintering occurs at relatively high temperatures that are not suitable for a ceramic composite structures as previously set forth. Further, tensile stresses develop across the joint between the ceramic tube and the metal tube upon cooling from the sintering process due to the larger thermal contraction of metals over that of ceramics. Moreover, the metal tube of Heider et al. is disposed inside the plug, which is disposed inside the ceramic tube, thereby creating a significant surface discontinuity along the outer surfaces thereof. Such surface discontinuities are unacceptable in aerospace applications due to the disruption of aerodynamic flow over the outer surfaces.

Accordingly, there remains a need in the art for a method of joining a ceramic matrix composite to a metal that is cost effective and that can withstand the extreme thermal conditions experienced in, for example, a rocket engine nozzle. A need further exists for a method of joining a ceramic matrix composite rocket nozzle to a metal manifold without performance degradations to the aerospace vehicle.

SUMMARY OF THE INVENTION

In one preferred form, the present invention provides a method of joining a ceramic matrix composite conduit to a metal conduit using an insert disposed inside both the ceramic matrix composite conduit and the metal conduit. In one form, the ceramic matrix composite conduit is a rocket nozzle, hereinafter referred to as a ceramic matrix composite rocket nozzle, and the metal conduit is a metal manifold, which have particular application to a rocket engine. It shall be appreciated, however, that the present invention has particular utility for applications other than rocket engines and the reference to rocket engines herein shall not be construed as limiting the scope of the present invention.

The insert is preferably co-processed with the ceramic matrix composite conduit, wherein the insert is placed inside a fiber preform and the fiber preform is infiltrated with a ceramic matrix and subsequently heat treated. Accordingly, the ceramic matrix bonds the insert to the inside of the ceramic matrix composite conduit during the infiltration process.

Furthermore, the insert that joins the ceramic matrix composite conduit to the metal conduit is preferably a silicon nitride or other material that has approximately the same or a smaller coefficient of thermal expansion as the ceramic matrix composite conduit. Generally, the coefficient of thermal expansion is approximately equal to or less than the ceramic matrix composite conduit in order to minimize tensile stresses that would occur between the insert and the ceramic matrix composite conduit during cooling after the infiltration process.

After processing of the ceramic matrix composite conduit, the metal conduit is then placed over the insert and secured thereto, preferably using brazing. Due to the larger coefficient of thermal expansion of the metal conduit over that of the insert, compressive stresses are introduced into the insert while the metal conduit experiences tensile stresses. Such a stress state is tailored to the specific properties of ceramics and metals, wherein ceramic materials exhibit high compressive strength and low tensile strength, while metal materials exhibit high tensile strength. Furhermore, a monolithic ceramic insert is preferred over a composite insert since the compressive strength of ceramic composites are lower than those of monolithic ceramics. As a result, a joint assembly is provided that is cost and weight effective, and which comprises a relatively smooth outer moldline surface for aerospace applications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-sectional view of a ceramic matrix composite conduit joined to a metal conduit using an insert in accordance with the present invention.

DETAILED DESCRIPTION OF THE PREFERRED EMBODIMENTS

The following description of the preferred embodiments is merely exemplary in nature and is in no way intended to limit the invention, its application, or uses.

Referring to the drawings, a joint assembly according to the present invention is illustrated and generally indicated by reference numeral 10 in FIG. 1. As shown, the joint assembly 10 comprises a ceramic matrix composite conduit 12 joined to a metal conduit 14 using an insert 16. In one form of the present invention, the ceramic matrix composite conduit 12 is a rocket nozzle for use in aerospace vehicles, which is hereinafter referred to as a ceramic matrix composite rocket nozzle. Similarly, the metal conduit 14 is a metal manifold in the rocket nozzle application.

It shall be appreciated that the application of the joint assembly 10 to rocket nozzles in an aerospace vehicles should not be construed as limiting the invention; rather, the application to aerospace is merely illustrative of one structure and one operating environment in which the present invention has particular utility. The joint assembly 10 of the present invention may further be employed with a wide variety of applications that require joining of ceramic matrix composites to metals in accordance with the teachings herein.

Preferably, the insert 16 is co-processed with the ceramic matrix composite conduit 12 for attachment thereto. Accordingly, the insert 16 is placed inside a fiber preform (not shown) and the fiber preform and insert are then infiltrated with a ceramic matrix precursor slurry, followed by a heat treatment, thereby forming the ceramic matrix composite conduit 12 and bonding the insert 16 to the inside of the ceramic matrix composite conduit 12. The fiber preform is preferably woven, and advantageously, the irregular surface thereof does not impose limitations on bonding the insert 16 to the ceramic matrix composite conduit 12.

Further, the insert 16 is preferably a silicon nitride or other material that has approximately the same or a smaller coefficient of thermal expansion as the ceramic matrix composite conduit 12. The coefficient of thermal expansion should be approximately the same or smaller in order to minimize tensile stresses that would occur along the interface between the insert 16 and the ceramic matrix composite conduit 12 during cool down after the infiltration process. Additionally, the ceramic matrix in one form of the present invention is silicon carbide, although other ceramic matrices commonly known in the art may also be employed. Moreover, the fiber preform preferably comprises continuous carbon fibers, although other fiber materials and forms may be employed according to specific application requirements.

The ceramic matrix for the ceramic matrix composite conduit 12 in one form is a slurry of silicon carbide powder in a polymer that decomposes to silicon carbide during heat treatment. Other matrix processing methods such as chemical vapor infiltration and melt infiltration, among others, may also be employed in accordance with the teachings of the present invention.

After the ceramic matrix composite conduit 12 is formed and the insert 16 is co-processed therein, the metal conduit 14 is secured to the insert 16 to form the joint assembly 10. Accordingly, the metal conduit 14 is placed over the insert 16 and is secured thereto. Preferably, the metal conduit 14 is secured to the insert 16 using brazing, although other methods commonly known in the art may also be employed. As applicable, the adjoining surface of the insert 16 may be prepared with relatively high smoothness and accuracy for an improved bond to the metal conduit 14.

Within a rocket engine assembly, the metal conduit 14 is secured to the ceramic matrix composite conduit 12 at one end and to a manifold (not shown) of the rocket engine at another end. In operation, large differences in thermal expansion and contraction occur between the manifold and the ceramic matrix composite conduit 12. Accordingly, the wall thickness and overall length of the metal conduit 14 are designed to allow sufficient flexibility such that the thermal expansions and contractions do not impose significant loads on the insert 16 or on the ceramic matrix composite conduit 12.

The cross-section of the ceramic matrix composite conduit 12, the metal conduit 14, and the insert 16 are preferably circular in one form of the present invention that has particular application to a rocket engine of an aerospace vehicle. Alternately, the cross-sections may be other geometrical shapes or combinations thereof such as rectangular, polygonal, or a "D" configuration, among others, according to the particular application requirements.

Additionally, a plurality of ceramic matrix composite rocket nozzles may exist on an aerospace vehicle, and accordingly, a plurality of inserts 16 may be employed to join the rocket nozzle to a corresponding plurality of metal manifolds. Therefore, either or both a single ceramic matrix composite rocket nozzle or a plurality thereof may be joined to a single metal manifold or a plurality thereof in accordance with the teachings of the present invention.

A heat exchanger, or rocket nozzle, has been developed and tested in accordance with the teachings of the present invention, wherein the rocket nozzle is co-processed with silicon nitride inserts and subsequently joined to a metal manifold. The rocket nozzle generally comprises a set of nine (9) side-by-side tubes formed from a carbon fiber preform, which in one form may be produced in one piece using a weaving process. Further, the fibers within the woven preform are preferably coated with pyrolytic carbon by chemical vapor infiltration. Silicon nitride inserts are placed in ends of the preform as illustrated in FIG. 1, wherein the inserts are tubular in cross-section with an outer diameter approximately equal to the inner diameter of the rocket nozzle tubes. Additionally, the wall thickness of the inserts is approximately 1 mm (0.04 in.) and the overall length is approximately four (4) times the outer diameter.

A matrix is added to the carbon fiber preform, with the inserts in place, by infiltrating the preform with a slurry of SiC powder in a liquid polymer (allylhydridopolycarbosiloane) that converts to SiC during subsequent heat treatment at temperatures up to 1600° C. (2,912° F.). After several cycles of infiltration and heat treatment, the matrix is nearly a fully dense silicon carbide (mixture of crystalline and amorphous SiC), and the inserts are strongly bonded to the composite. Preliminary testing in which the rocket nozzle tubes were pressurized to failure showed that the failure occurred within the composite tubes and not at the bond between the insert and the composite tubes, therefore indicating that the bond is stronger than the composite tubes. To complete the rocket nozzle assembly, the silicon nitride inserts protruding from the tubes are then brazed to stainless steel tubes that communicate with further manifolds.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A joint assembly comprising:
   at least one ceramic matrix composite conduit reinforced with carbon fibers;
   at least one metal conduit; and
   a monolithic ceramic insert disposed inside the ceramic composite conduit and the metal conduit;
   wherein the ceramic composite conduit is joined to the metal conduit using the insert.

2. The joint assembly of claim 1, wherein the insert is bonded to the ceramic matrix composite conduit.

3. The joint assembly of claim 1, wherein the metal conduit is brazed to the insert.

4. The joint assembly of claim 1, wherein the ceramic matrix composite conduit, the insert, and the metal conduit comprise a circular cross-section.

5. The joint assembly of claim 1, wherein the ceramic matrix composite conduit comprises a silicon carbide matrix.

6. The joint assembly of claim 1, wherein the insert is a monolithic ceramic having a coefficient of thermal expansion approximately equal to or less than the ceramic matrix composite conduit.

7. The joint assembly of claim 1, wherein the insert is silicon nitride.

8. The joint assembly of claim 1 further comprising a plurality of inserts that join a plurality of ceramic matrix composite conduits to a plurality of metal conduits.

9. A joint assembly for use in a rocket nozzle comprising:
   at least one ceramic matrix composite rocket nozzle comprising reinforcing carbon fibers in a ceramic matrix;
   at least one metal manifold; and
   a silicon nitride insert disposed inside the ceramic matrix composite rocket nozzle and the metal manifold,
   wherein the ceramic matrix composite rocket nozzle is joined to the metal manifold using the silicon nitride insert.

10. The joint assembly of claim 9, wherein the silicon nitride insert is bonded to the ceramic matrix composite rocket nozzle.

11. The joint assembly of claim 9, wherein the metal manifold is brazed to the silicon nitride insert.

12. The joint assembly of claim 9, wherein the ceramic matrix composite rocket nozzle comprises a silicon carbide matrix.

13. The joint assembly of claim 9, wherein the ceramic matrix composite rocket nozzle, the silicon nitride insert, and the metal manifold comprise a circular cross-section.

14. The joint assembly of claim 9 further comprising a plurality of silicon nitride inserts that join a plurality of ceramic matrix composite rocket nozzles to a plurality of metal manifolds.

15. A process for joining a ceramic matrix composite conduit to a metal conduit comprising the steps of:
   (a) providing the ceramic matrix composite conduit reinforced with carbon fibers;
   (b) securing a monolithic ceramic insert inside at least one fiber preform of the ceramic matrix composite conduit;
   (c) co-processing the monolithic ceramic insert with the fiber preform;
   (d) placing a metal conduit over the monolithic ceramic insert;
   (e) securing the metal conduit to the monolithic ceramic insert; and
   wherein, the ceramic matrix composite conduit is joined to the metal conduit using the insert.

16. The process of claim 15, wherein the step of co-processing comprises infiltrating a ceramic matrix precursor slurry into the fiber preform and the insert and heat treating, thereby forming the ceramic matrix composite conduit and bonding the insert to an inside of the ceramic matrix composite conduit.

17. The process of claim 15, wherein the metal conduit is secured to the insert using brazing.

18. A method of joining a ceramic matrix composite rocket nozzle to a metal manifold comprising the steps of:
   (a) providing the ceramic matrix composite rocket nozzle reinforced with carbon fibers;
   (b) securing a silicon nitride insert inside a fiber preform of the ceramic matrix composite rocket nozzle;
   (c) co-processing the silicon nitride insert with the fiber preform;
   (d) placing a metal manifold over the silicon nitride insert; and
   (e) brazing the metal manifold to the silicon nitride insert.

19. The method of claim 18 wherein the step of co-processing comprises infiltrating a ceramic matrix precursor slurry into the fiber preform and the silicon nitride insert and heat treating, thereby forming the ceramic matrix composite rocket nozzle and bonding the silicon nitride insert to an inside of the ceramic matrix composite rocket nozzle.

* * * * *